Jan. 16, 1923.
C. A. FOX.
METHOD OF PRODUCING BUILDING MATERIAL.
FILED JULY 21, 1921.
1,442,764.
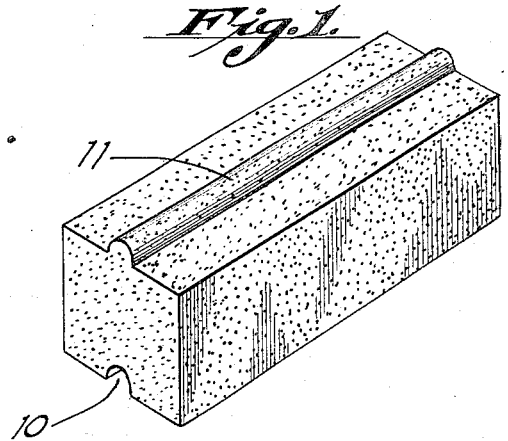
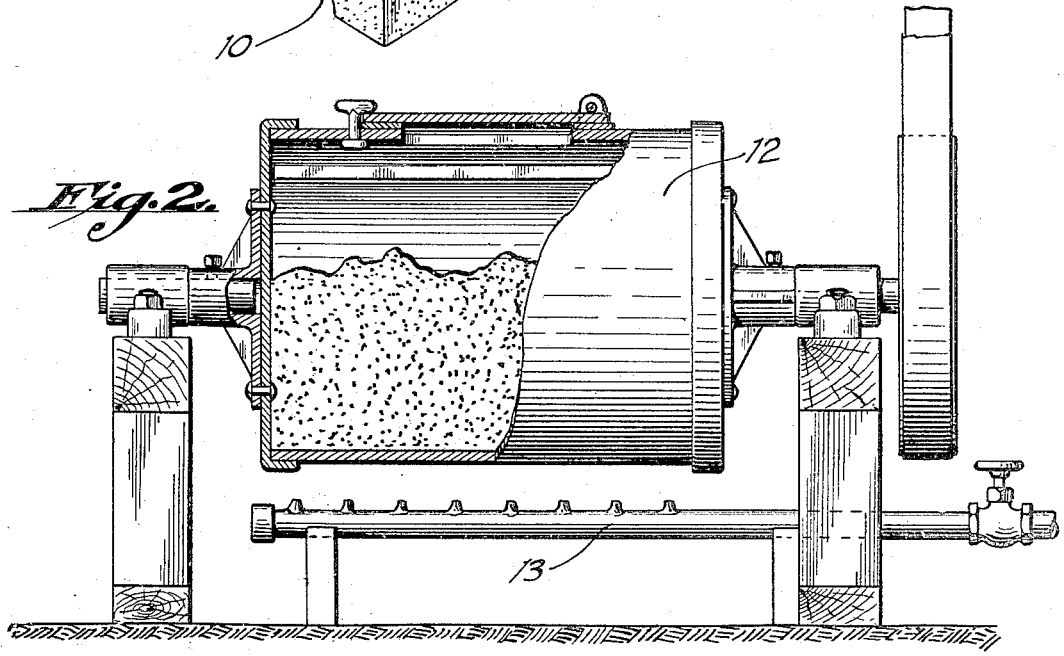
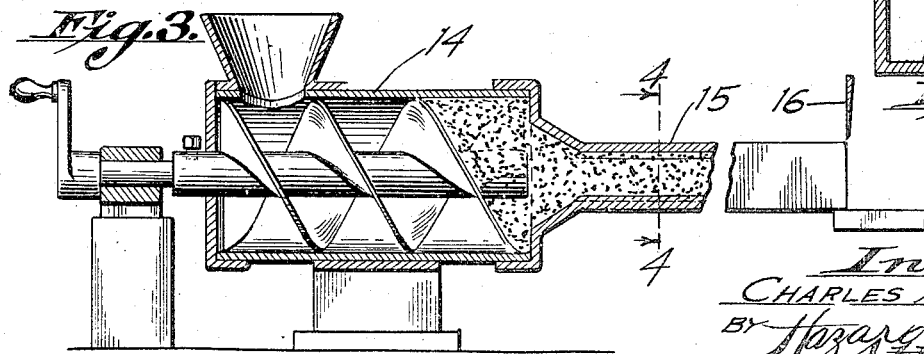
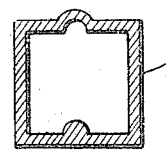
Inventor:
CHARLES A. FOX.
By Hazard & Miller
Attorneys Patented Jan. 16, 1923.

1,442,764

UNITED STATES PATENT OFFICE.

CHARLES A. FOX, OF TAFT, CALIFORNIA.

METHOD OF PRODUCING BUILDING MATERIAL.

Application filed July 21, 1921. Serial No. 486,443.

*To all whom it may concern:*

Be it known that I, CHARLES A. Fox, a citizen of the United States, residing at Taft, in the county of Kern and State of California, have invented new and useful Improvements in Methods of Producing Building Material, of which the following is a specification.

My invention relates to building material and the method of producing the same; the principal objects of my invention being to produce, by a relatively simple and easily practiced method, building material in the form of blocks that may be readily assembled in the construction of foundations, walls, partitions, or in fact any part of a building structure.

A further object of my invention is to produce building material having an ingredient that becomes relatively soft when heated and which ingredient has adhesive properties so that it will serve to effectually bind the blocks or sections of building material to each other when the same are assembled to form a wall, partition, or other similar structure.

Further objects of my invention are to provide building material that may be produced at relatively low cost and which material when properly manufactured is both fire-proof and water-proof.

With the foregoing and other objects in view, my invention consists in certain novel features of construction and arrangement of parts that will be hereinafter more fully described and claimed and illustrated in the accompanying drawings, in which:

Figure 1 is a perspective view of a block of building material constructed in accordance with my invention.

Fig. 2 is an elevational view partly in section of an apparatus that may be used for mixing and heating the ingredients that enter into the manufacture of the building material.

Fig. 3 is a sectional view of an apparatus that is utilized for pressing and forming the blocks of material.

Fig. 4 is a sectional view of a chute or spout that is utilized or conveying the formed material to the point of use as contemplated by my improved method.

The building material contemplated by my invention is composed of earthy material, for instance ordinary soil or clay combined with a relatively small proportion of asphaltum or analogous oleaginous substance, and which latter when heated and thoroughly distributed through the body of earthy material performs the functions of a binder to cause the particles of earth or clay to adhere to each other, and consequently causing the block or body of building material to retain its shape after having been properly formed under a certain degree of pressure.

Where my improved building material is manufactured in block form, I prefer to produce substantially rectangular blocks of the general shape illustrated in Fig. 1, and for the building of foundations, walls, partitions, and the like, a block having a width and height of approximately four inches and a length of approximately twelve inches may be very conveniently handled.

In order that the blocks may be readily assembled by unskilled workmen, I prefer to form the block with a longitudinally disposed groove, such as 10, in one of the faces of the block, and a corresponding longitudinally disposed rib 11 on the opposite face. This construction facilitates the laying of the blocks and insures the formation of a straight wall or like building structure.

The mixing of the earth and asphaltum may be accomplished in any suitable manner, but I prefer to place the ingredients in a container, such as 12, that may be rotated in any suitable manner in the presence of heat, and which latter may be generated by the combustion of gas or oil from a suitably located burner 13. As the container 12 is rotated, the earth will be broken up and pulverized, and at the same time the heat will liquefy the asphaltum and the latter will be very thoroughly distributed throughout the entire body of pulverized earth. After the earth has been thus pulverized and impregnated with the liquid asphaltum, it is delivered into a suitable press, such as 14, and is forced from said press through a forming tube 15, the chamber within which has the cross sectional shape of the finished blocks, and the material forced through this forming tube will be compressed and the liquid asphaltum will serve as a binder to cause the particles of earth to firmly adhere to each other.

The forming tube 15 may be extended for any desired distance away from the press 14, and the end of said tube may be located adjacent to the point where the building blocks are to be laid, and as the continuous body of block material issues from the end of said tube, said body may be cut into sections of the desired length by a suitable knife or blade 16. As the sections or blocks of material are cut from the end of the forming tube, the surfaces thereof are coated with a thin film of liquid asphaltum due to the pressure of the apparatus utilized in forming the blocks, and this film of asphaltum serves as a binder between the blocks when the same are laid, and thus a wall or building structure may be produced without the use of additional binding material in the nature of plaster or concrete.

The building material thus formed is both fire and water proof, is composed of materials that are readily obtainable in all parts of the country, may be easily and cheaply produced, and can be advantageously used wherever a strong and substantial building structure is desired.

Obviously the blocks or building elements may be made in various shapes and sizes in accordance with different requirements, and any suitable apparatus may be utilized for effecting the thorough mixing, heating and compressing of the material from which the blocks are formed.

I claim as my invention:

1. The herein described method of producing building material which consists in mixing earthy material with oleaginous substance in the presence of heat, then compressing the mixture to give the same the desired shape, conveying the compressed material while in a heated condition to the point of use, and then dividing said material into usable sections.

2. The herein described method of producing building blocks, which consists in mixing earthy material with asphaltum in the presence of heat, then compressing the mixture into a strip having the desired cross sectional contour, conveying the strip while in a heated condition to the point of use, and then dividing the strip into blocks.

3. The herein described method of producing building blocks, which consists in mixing earthy material with oleaginous substance in the presence of heat, then compressing the mixture into a body having the desired cross sectional contour, conveying the body while in a heated condition to the point of use, and then dividing the body into blocks.

In testimony whereof I have signed my name to this specification.

CHAS. A. FOX.